3,440,012
CATALYTIC OXIDATION OF SULFHYDRYL COMPOUND
Wilhelm E. Walles, Midland, and Stanley S. Leff, Bay City, Mich., assignors to The Dow Chemical Company, Midland, Mich., a corporation of Delaware
No Drawing. Filed Sept. 26, 1966, Ser. No. 581,703
Int. Cl. C01b *17/04*
U.S. Cl. 23—225                3 Claims The present invention, titled Catalytic Oxidation of Sulfhydryl Compound, is directed to the low-temperature oxidation of a compound containing a sulfhydryl group to elemental sulfur, releasing a compound containing a hydroxyl group. In summary, a compound containing a sulfhydryl group such as hydrogen sulfide, a mercaptan, or the like, is brought into initimate contact, in the presence of water, with an oxazolidinone or morpholinone compound at a pH near neutral and at a temperature above the freezing temperature of water and at any higher temperature with which the oxazolidinone or morpholinone compound is compatible and water is liquid, whereby elemental sulfur is released and the hydroxyl compound corresponding to the sulfhydryl starting material is released as byproduct.

It is known to scrub hydrogen sulfide from gases by oxidation in the presence of pyrrolidinone or a N-loweralkyl pyrrolidinone. Note U.S. Patent 3,103,411.

The present invention is practiced by bringing together a sulfhydryl compound, water, and either an oxazolidinone or morpholinone compound. For preferred convenience in operation and preferred efficacy of result, a polymeric compound upon the structure of which recurring oxazolidinone or morpholinone groups appear is desired. Representative such polymeric compounds include polymeric N-vinyl oxazolidinone, polymeric N-vinyl-5-methyl oxazolidinone, polymeric N-vinyl morpholinone, polymeric vinylbenzyl-$\alpha$-(N-oxazolidinone), and polymers similar to the foregoing but containing cross linking agents to reduce their solubility in water. Oxazolidinone and morpholinone alone can be used.

The present invention is readily practiced by preparing an aqueous dispersion, which can be a solution, of the oxazolidinone or morpholinone compound, or can be a viscous, somewhat particulate, or distinctly particulate gel-like dispersion of cross linked or vinyl benzyl-type polymer in water. The aqueous preparation can be used as a liquid bath through which the sulfhydryl-containing substance is bubbled as a gas or, if desired, can be dispersed over and upon a column-packing structure. When the physical form of the sulfhydryl compound renders it advantageous, the sulfhydryl compound can be mixed into the aqueous catalytic substance dispersion or, conversely the aqueous oxazolidinone or morpholinone dispersion can be mixed into the sulfhydryl-containing substance. The catalytic oxidation according to the present invention does not affect, or at least does not affect appreciably, hydrocarbon substances and the like so that the present invention is well-adapted to scrub, for example, hydrogen sulfide and lower alkyl mercaptans from petroleum products from which it is desired to remove them.

Sulfur is liberated in the form of elemental sulfur, usually as a finely subdivided crystalline substance which, in the absence of agitation or the like, precipitates. When employing a liquid bath technique, whereby the sulfhydryl-containing substance is introduced into and beneath the surface of a liquid, the liquid can, if desired, contain as a separate phase a liquid solvent for sulfur immiscible with water whereby the sulfur is liberated in the form of a solvent solution. Provision can be made for cycling the said sulfur-solvent through means for the removal or partial removal of sulfur and recycling the solvent.

It is pointed out that polymeric 5-methyl-3-vinyloxazolidinone, while readily water-soluble at room temperature, becomes reversibly insoluble or of limited solubility at a cloud-temperature of 38° C. and for some temperatures above this point. When employing this particular catalytic substance, the cloud-temperature range should be avoided unless it is desired to bring the sulfur and the catalytic substance out of solution together. It is noted that the cloudy, incipient precipitate form of the said catalytic polymer does not impair its ability to oxidize the sulfhydryl-containing substance. Similar considerations may pertain to other catalytic substances.

As to procedural steps to be followed, the present invention can be practiced in essentially the manner set forth in U.S. Patent 3,103,411 for use with pyrrolidinone and certain of its derivatives with the observation that the method of the present invention goes forward at a preferable rate when the aqueous catalytic material is approximately neutral. Further, in using counter current gas techniques in a column, it is convenient to employ the catalytic oxazolidinone or morpholinone compound in the form of a water-insoluble resinous bead having the active moieties as part of its structure.

The following examples set forth the best mode now known of practicing the present invention.

EXAMPLE 1

That some intermediate of limited stability is formed by the contacting of hydrogen sulfide with aqueous 10 percent polymeric 5-methyl-3-vinyloxazolidinone was established by introducing, under atmospheric pressure and at 25° C., hydrogen sulfide as a gas into a weighed sample of such aqueous solution. Upon one occasion, 2.18, and upon another occasion, 2.14 volumes of hydrogen sulfide were retained, in the absence of air, in the said solutions. The corresponding capacity of pure water for hydrogen sulfide under the same conditions was, upon one occasion, found to be 1.69 and, upon another occasion, 1.65 volumes. The difference, approximately half the volume of the aqueous material, represents some tentative binding of about 1 molecule of hydrogen sulfide per 29 recurring 5 - methyl - 3 - vinyloxazolidinonyl units in the polymer.

EXAMPLE 2

That the incompletely stable adduct of hydrogen sulfide and polymeric 5-methyl-3-vinyloxazolidinone can be isolated was established by liquifying hydrogen sulfide gas at approximately −62° C., and, thereinto stirring dry, powdered, polymeric 5-methyl-3-vinyloxazolidinone of a K-value according to Fikentscher of 30. The resulting mixture was stirred and, upon stirring, became a thick, heavily viscous, gel-like substance not transparent. Upon completion of the formation of the said gel, the reaction vessel and content were permitted to return slowly to room temperature, hydrgen sulfide was vaporized and removed, and a fine white powder of polymeric 5-methyl-3-vinyloxazolidinone together with bound hydrogen sulfide remained. Upon X-ray fluorescence analysis, the powder was found to contain 0.40 weight percent sulfur corresponding to 1.6 mole percent hydrogen sulfide; on a molecular basis for the employed monomer moieties in polymer. This represents approximately 1 molecule hydrogen sulfide bound per each 60 recurring 5-methyl-3-vinyloxazolidinone units in the polymer.

Essentially the same procedures were repeated, but employing polymeric N-vinylmorpholinone. Bound sulfur was found to be 0.53 percent.

EXAMPLE 3

A mixture of hydrogen sulfide gas and an amount of air of which the oxygen was more than stoichiometric for the oxidation of employed hydrogen sulfide, was bubbled through water for 5 minutes to observe whether spontaneous oxidation of the hydrogen sulfide would result. No clouding of the water occurred, and no free sulfur could be demonstrated.

EXAMPLE 4

A mixture of hydrogen sulfide and air, the air in an amount such that its oxygen content was approximately stoichiometric with the employed hydrogen sulfide was bubbled through a 1 percent aqueous solution of polymeric 5-methyl-3-vinyloxazolidinone for 5 minutes. The solution became cloudy as a result of the precipitation of sulfur.

EXAMPLE 5

The procedures of Example 3 were repeated except that air alone was bubbled through the polymer solution. No precipitate was formed.

EXAMPLE 6

The procedures of Example 3 were repeated except that, in separate catalyst solutions of equal volume, concentration of the catalytic oxazolidinone material was, variously (1, 2, 4, 5, 7 and 10 weight percent polymeric 5-methyl-3-vinyl-2-oxazolidinone.

Clouding from the precipitation of elemental sulfur began at approximately the same time and went forward at approximately the same rate in each of the solutions, indicating that, approximately, and within the range of concentrations tested, the amount of catalytic substance was indifferent. From this it was concluded that the catalytic action is not of an ultimately stoichiometric nature.

EXAMPLE 7

The present example repeats Example 6 foregoing, except that the catalytic material employed was polymeric N-vinylmorpholinone. The results observed were essentially indistinguishable from those when employing the oxazolidinone compound.

EXAMPLE 8

In the present example, the procedures were essentially the same as those in Example 3 except that there was employed a 5 weight percent solution in water of polymeric 5-methyl-3-vinyl-2-oxazolidinone acidified with sulfuric acid to the concentration of 0.1 normal. Into the resulting acidified solution, hydrogen sulfide and air were bubbled together for four hours. At the end of this time, there was no evidence of cloudiness or of a precipitate of elemental sulfur.

EXAMPLE 9

Essentially the procedures of Example 8 foregoing, were repeated except that the oxazolidinone compound was dispersed in 0.1 normal aqueous sodium hydroxide. This was purged with a mixture of hydrogen sulfide and air for ½ hour. The resulting dispersion showed no cloudiness or evidence of catalytic formation of sulfur. It was then permitted to stand for 24 hours at the end of which time a precipitate had formed. It was identified as sulfur. To ascertain whether the sulfur was precipitated by a hitherto unrecognized catalytic activity of the sodium hydroxide solution alone, a 0.1 normal sodium hydroxide solution containing no other active substance was purged for ½ hour with hydrogen sulfide and air mixture. No precipitate was formed, and upon 24 hours standing, none was formed. It was concluded that the catalytic release of elemental sulfur, though delayed, was ascribable to the polymeric 5-methyl-3-vinyl-2-oxazolidinone.

In the example foregoing, to ascertain the identity of the precipitate, it was isolated by filtration, to obtain a yellow powdery material. Portions of this material were found, variously, to melt at about 120° C.; to burn to recognizable sulfur dioxide with a blue flame; and to blacken a silver coin which was rubbed with the material.

EXAMPLE 10

A mixture of air, methyl mercaptan, and propane, the air in an amount sufficient to supply oxygen stoichiometric with the sulfur in the methyl mercaptan, were bubbled slowly through a relatively viscous dispersion of polymeric 5-methyl-3-vinyl-2-oxazolidinone lightly crosslinked with divinylbenzene to obtain an infinitely swellable, theoretically insoluble polymer. As employed, it was extensively swollen with water to yield an essentially very viscous solution-like preparation. The catalytic mixture promptly became cloudy through release of elemental sulfur as fine crystals which were separated by solvent extraction; and the presence of methanol was demonstrated by vapor phase chromotography.

In procedures essentially similar to those exemplified, modified by distribution of the catalytic aqueous oxazolidinone or morpholinone compound over column-packing forms, and supplying oxygen and sulfhydryl-bearing material as counter current gases, the present invention is adapted to industrial-scale employment. In such application, if desired, the aqueous catalytic material can be supplied in the form of a slowly added and slowly removed current of such aqueous material, which can be filtered continuously as it leaves the reaction column, to separate elemental sulfur and, thereafter, be recycled for further use. It is observed that the catalyst has not been found to be significantly consumed nor "poisoned" by the process.

The oxazolidinone or morpholinone compound need not be a polymer. Oxazolidinone itself is useful, N-loweralkyl oxazolidinone compounds are also available. Similarly, oxazolidinone compounds having up to 3 loweralkyl substituents, two on the available carbon atoms and one on the nitrogen atom of the ring, may be employed. However, whatever such oxazolidinone compound sought to be employed, its dispersibility in, or at least contact compatibility with water must be considered. Thus, compounds bearing long-chain hydrophobic moieties, while effective, are less satisfactory more than water-compatible forms.

Similarly, the morpholinone compounds need not necessarily be a polymer although certain polymeric compounds are preferred. A N-loweralkyl morpholinone, or a morpholinone having one or more such substituents on carbon atoms can be employed.

Also, in a column or the like, it is unnecessary to employ an aqueous solution of the compound over an inert column-packing material. Instead, a water-insoluble polymer such as a polyvinylbenzyloxazolidinone can be prepared in the form of beads which can be used to pack a column, maintained in a continuous moist condition, and supplied with the reacting gases co-current or counter-current.

We claim:

1. Catalytic process for the oxidation to yield elemental sulfur, of a compound in vapor phase bearing a sulfhydryl group, which comprises the step of mixing the said compound in said vapor phase with gaseous oxygen of amount at least stoichiometric to the oxidative reaction desired and thereafter contacting the resulting gaseous mixture in the presence of water with an oxazolidinone or morpholinone compound at a pH near neutral and at a temperature at which water is liquid, whereby elemental sulphur is released.

2. Method of claim 1 wherein oxygen is supplied as air.

3. Method of claim 2 wherein the sulfhydryl compound is hydrogen sulfide.

References Cited

UNITED STATES PATENTS

| | | | |
|---|---|---|---|
| 2,065,112 | 12/1936 | Bottoms | 23—2 |
| 2,486,778 | 11/1949 | Doumani | 23—2 |
| 2,819,950 | 1/1958 | Patton | 23—225 |
| 3,095,275 | 6/1963 | Fierce et al. | 23—225 |
| 3,103,411 | 9/1963 | Fuchs | 23—2 |

FOREIGN PATENTS 734,577 8/1955 Great Britain.

OTHER REFERENCES

D'Albe, E. F.: Organic Chemistry, vol. III, Heterocyclic compounds, P. Blakiston's; Philadelphia, 1923.

E. C. THOMAS, *Primary Examiner.*

G. O. PETERS, *Assistant Examiner.*